May 16, 1950          G. LE BON          2,507,914
HAND ABRADING TOOL
Filed June 26, 1946
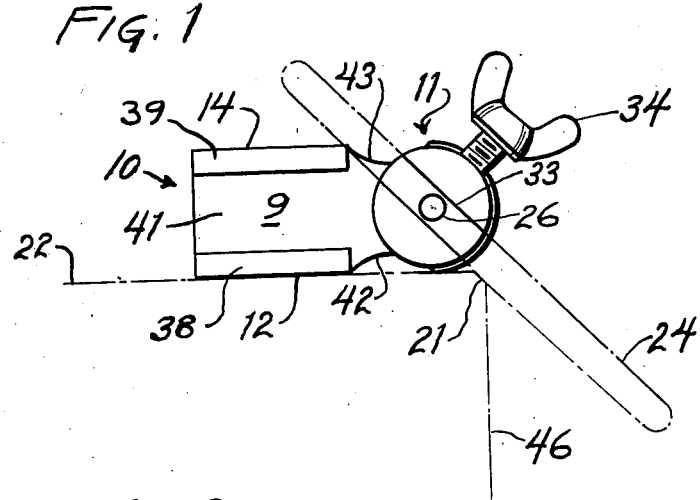
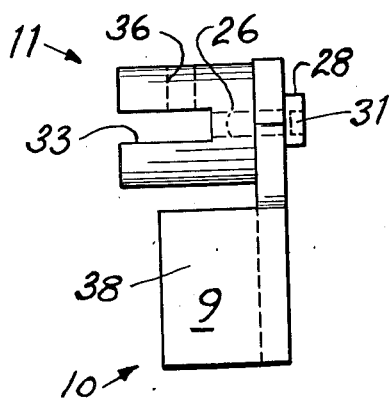
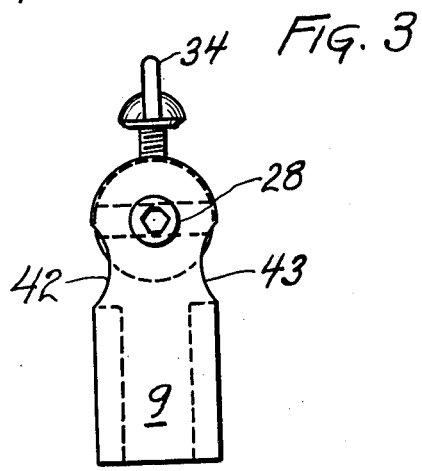
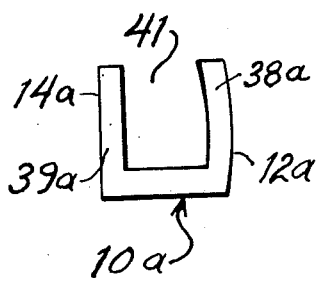
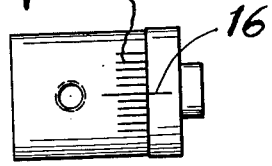
INVENTOR
George Le Bon
BY
ATTORNEY Patented May 16, 1950

2,507,914

UNITED STATES PATENT OFFICE 2,507,914

HAND ABRADING TOOL

George Le Bon, Great Neck, N. Y.

Application June 26, 1946, Serial No. 679,397

2 Claims. (Cl. 29—76)

The present invention relates to tools and, more particularly to hand abrading tools. In accordance with the invention, a hand tool for accurate filing of bevels and the like is provided. A tool embodying the invention is useful generally where accuracy is desired for filing purposes. For example, it is useful for die and jig work and on forming blocks, templates, tools and the like.

A hand tool embodying the invention comprises a holder for a file or other abrading device which is provided with a guide surface and means to incline the file with respect to the guide surface. The degree of inclination can be set by a scale. The guide surface of the tool slides on a finished surface of the work in hand, thereby insuring accuracy of the filing or other abrading operation performed with the aid of the tool.

An object of the invention therefore, is to provide an improved abrading tool for filing bevels.

A further object of the invention is to provide a novel abrading tool having a guide surface for cooperation with a plane or curved surface of a work piece.

Another object of the invention is to provide a novel abrading tool having a guide portion and an abrading tool holding portion at a definite angle with respect to the guide portion.

Other and more specific objects will become apparent to one skilled in the art as the description proceeds with reference to the accompanying drawing in which:

Fig. 1 is a front view of a tool embodying the invention, the manner of using the tool being illustrated;

Fig. 2 is a view in side elevation;

Fig. 3 is a back view;

Fig. 4 is an end view of the tool of Fig. 1 to illustrate a special feature or a modification thereof; and Fig. 5 is a view of the opposite end of the tool to illustrate the setting scale.

Referring to the drawings, the tool 9 of this invention comprises a guide part, indicated generally by reference character 10, and a tool holding part, generally designated 11. The sides 12 and 14 of the part 10 are finished so that they are parallel and also parallel to a line passing through the center of the part 11 and the "zero" mark 16 which cooperates with a scale 19 (Fig. 5). It will be understood that only one of the sides 12 or 14 need be finished, or one of these sides may be convex as shown in the modification of Fig. 4. The latter arrangement facilitates use of the tool on a contour.

Fig. 1 illustrates use of the tool 9 to file a bevel 21 on a work piece 22 shown in dot-dash outline. Fig. 1 also shows a file 24 or other metal working tool clamped in position in the tool holding part 11. The part 11 is set at 45 degrees with respect to the part 10 in Fig. 1 thereby illustrating the filing of a 45 degree bevel.

In more detail, the part 11 of the tool 9 is generally cylindrical. A threaded aperture 26 is coaxial with the axis of the part 11. A clamping screw 28 is engaged in this aperture and holds the part 11 in its position of adjustment with respect to the part 10. Any desired type of screw may be used, but an "Allen" type is illustrated having a socket 31 to receive a special driving key or tool. While the part 11 is shown as being cylindrical, since this is a convenient form to manufacture, it will be understood that it may have any desired shape. Its inside end is finished flat so that it fits snugly against the part 10.

A slot 33 holds the cutting or abrading tool, for example the file 24, which is clamped in position by a thumb screw 34 engaged in a threaded hole 36. The part 11 will hold a flat or half-round file or similar tool.

The part 10 may be of unitary construction for accuracy, the finished surfaces 12 and 14 being provided on wings 38 and 39. The groove 41 is for the purpose of lightness of the entire tool 9. The recesses 42 and 43 provide chip clearance when the tool 9 is in use.

The adjusted position of the part 11 is indicated by graduations of the scale 19 and the zero mark 16 on the part 10. The part 11 is preferably adjustable through 45 degrees each way.

Fig. 4 of the drawings shows a modified form of the part 10 which is designated 10a. One of the finished surfaces 12a is formed on a radius for contour work. For example, if the surface of the work piece 22 of Fig. 1 is concave, the surface 12a would be used.

From the preceding description, it is believed that the use of the tool 9 will be apparent. The part 11 is set at the desired angle by using the scale 19, the file 24, or other desired tool is clamped in position by the thumb screw 34 and the tool 9 is moved to and fro on the work piece parallel to the work piece edge 46.

What is claimed is:

1. A hand tool for holding an abrading or cutting implement comprising, a channel-shaped holder having a pair of spaced flanges constituting guide surfaces for sliding contact with a work piece, said flanges being connected by a web having a forward part extending beyond the flanges to form a lug, an implement-holding part pivotally attached to the lug by pivoting means adjustable to hold said part in any selected position, said implement-holding part having a free end formed with an open-ended implement-receiving slot extending inwardly from said free end for a portion of the length of the part, and implement-clamping means extending transversely of said part and entrant into the slot to engage and clamp a tool therein.

2. A hand tool for holding an abrading or cutting implement comprising, a holder having a relatively flat surface for slidable reception on a surface of a work piece, a lug extending forwardly of the holder, a substantially cylindrical implement-receiving member pivotally attached at one of its ends to said lug, the other end of said member being a free end and being inwardly slotted from said end for a portion of its length to receive an implement, and a threaded clamping member extending through the implement-receiving member at right angles to the axis of the member and entering the slot to engage and clamp an implement therein.

GEORGE LE BON.

REFERENCES CITED

The following references are of record in the file of this patent:

UNITED STATES PATENTS

| Number | Name | Date |
|---|---|---|
| 438,271 | Johnson | Oct. 14, 1890 |
| 2,373,829 | Hicks | Apr. 17, 1945 |